United States Patent Office 3,565,679
Patented Feb. 23, 1971

3,565,679
LEACHPROOF FIRE-RESISTANT COMPLEX FOR CELLULOSIC SUBSTRATES
Greene W. Strother, Jr., Lake Jackson, Tex., assignor to The Dow Chemical Company, Midland, Mich., a corporation of Delaware
No Drawing. Filed June 3, 1968, Ser. No. 733,792
Int. Cl. C09d 5/18; C09k 3/28
U.S. Cl. 117—136    7 Claims

ABSTRACT OF THE DISCLOSURE

Cellulosic substrates, e.g. wood, textiles or paper, have increased fire-resistance when treated with an aqueous solution of a complex of a polyalkylene-polyamine, e.g. polyethylenimine, and a condensation product of phosphorus pentoxide and ammonia. Application of the complex is by conventional methods, e.g. spraying, painting, or dipping, and results in leachproof protection.

BACKGROUND OF THE INVENTION

It is known to impart fire-resistance to cellulsosic substrates by impregnation with certain agents. See, for example, U.S. 3,242,004 (wood); U.S. 2,870,042 (textiles); and U.S. 3,027,295 (paper). In general, the fireproofing agents fall into two classes: (1) non-permanent materials that are susceptible to leaching, e.g. the phosphates, borates and sulfonates, and (2) permanent materials that are leachproof, e.g. tris(1-aziridinyl)phosphine oxide and melamine resins.

It is, of course, more desirable to have permanent protection, but the permanent materials have several processing difficulties that render commercial fireproofing impractical, e.g. toxicity, long curing times, high temperature curing and multi-stage processes requiring expensive equipment.

SUMMARY OF THE INVENTION

It has now been found that a complex of a polyalkylenepolyamine and a condensation product of phosphorus pentoxide and ammonia is an excellent fireproofing agent for cellulsosic substrates. In addition, leachproof protection for these substrates is obtained by a simple process requiring inexpensive equipment and essentially no monitoring.

The polyalkylenepolyamines useful in this invention are well known in the art and include those obtained from reacting an alkylenepolyamine (e.g. ethylenediamine, 1,2-propylenediamine, diethylenetriamine, tetraethylenepentamine) with a difunctional chain-extending and cross-linking agent (e.g. 1,2-dichloroethane, epichlorohydrin). Also included within the term polyalkylenepolyamine is polyethylenimine, generally produced by the polymerization of ethylenimine in the presence of an acid catalyst, the corresponding polypropylenimines, and the like. In general, the average molecular weight of the polyalkylenepolyamines used in this invention is between 1,000 and 100,000, and preferably, between 20,000 and 60,000.

The condensation product of phosphorus pentoxide and ammonia that is used in conjunction with the polyalkylenepolyamine is a phosphorus oxide-nitrogen complex. One method of making this complex is to pass ammonia gas through solid $P_2O_5$ under vigorous agitation at room temperature. The resulting compound is then heated for several hours at a temperature of 150° C. or higher while in the presence of ammonia gas. About one-half to two-thirds of the total ammonia gas is preferably introduced prior to raising the temperature. The above-described method and other methods of making the phosphorus oxide-nitrogen complexes useful in this invention are more fully set out in U.S. 2,122,122, the disclosure of which is hereby incorporated by reference.

In order to practice this invention, the polyalkylenepolyamine and an aqueous solution of the condensation product of phosphorus pentoxide and ammonia are simply mixed and applied to the cellulosic substrate in any conventional manner, e.g. spraying, painting or dipping. It is preferred to use an excess of the condensation product of phosphorus pentoxide and ammonia in the mixture; generally a weight ratio of condensation product to polyalkylenepolyamine between 10/1 and 1/1 will suffice for good protection. It is preferred to dilute the mixture of polyalkylenepolyamine and condensation product of phosphorus pentoxide and ammonia (hereinafter referred to as mixture A) with water. This dilution usually facilitates treatment of the cellulosic substrate. After application, the then-treated substrate is cured in a usual manner, e.g. in a forced draft oven. The term cure, as used herein, is meant to denote the loss of water and ammonia, thus forming a water-insoluble complex of a polyalkylenepolyamine and the condensation product of phosphorus pentoxide and ammonia. The cure can be effected at ambient temperature. The temperature of the cure is not critical and, depending on the substrate treated and how rapid a cure is desired, can vary widely, e.g. between 50 and 250° F.

A preferred embodiment of this invention is to treat a cellulosic substrate with a mixture comprising an aqueous mixture A, e.g. between 5 and 50 percent solids, and a volatile base, e.g. with ammonium carbonate, ammonium hydroxide, or ammonium bicarbonate. The base is added in an amount sufficient to prevent precipitation of the solids from the aqueous mixture A. Typically, a pH between 7.0 and 10.0 and preferably between 8.0 and 9.5 will prevent precipitation. The pH of the solution is easily controlled by addition of more or less volatile base. After application of the base-containing aqueous mixture A, the volatile base is substantially liberated upon curing, thus forming the protected substrate.

The amount of solids pick-up of the cellulosic substrate can vary widely, depending upon the protection required. In general, based on the substrate, the amount of solids pick-up is between 0.5 and 20 percent, preferably between 2 and 10 percent.

The cellulosic substrates that are protected by mixture A include wood, textiles and paper. Any species of wood is protected by the practice of this invention, e.g. softwoods such as southern pine and ponderosa pine, hardwoods such as maple and oak. Other woods protected include aspen, redwood, red oak, rock elm, spruce, cedar and fir. Any species of hydrophilic fibrous material is protected by the practice of this invention, e.g. cotton, rayon, jute, paper, cardboard and the like.

DESCRIPTION OF SPECIFIC EMBODIMENT

Example 1

425 g. of a 40% aqueous solution of a condensation product of phosphorus pentoxide and ammonia (commercially available from Stauffer Chemical Company, under the trade name Victamide; containing about 75% $P_2O_5$ and 22% total ammonia of which about 7% is in the form of amide N) was mixed with 76.7 g. of a 39.2% aqueous solution of polyethylenimine having an average molecular weight of 60,000 and 250 g. of 37% aqueous $NH_4OH$. 250 g. of $H_2O$ was then added and mixed to make a 20% by weight solute formulation. Cedar roofing shingles were immersed in the formulation for 2 minutes, then dried and tested. The weight pick-up was 7.6%, based on the untreated shingles. The treated shingles were dried at 90° C. for 15 minutes, placed on a rack at a 45° angle under a spray head and showered with water until an equivalent of 1½" of rain, as measured by a standard rain gauge, had fallen on them. The shingles were then dried at ambient temperature and the showering-drying cycle repeated for a total of 30 cycles. The following burning test was then employed: A propane torch, with the blue tip of the flame adjusted to ¾″, was placed so that the edge of the burner just touched the treated shingle, 3½″ above the thin end. The burner was positioned so that the flame was 45° to the shingle and in contact with the shingle for 30 seconds, then removed. The burning time for the treated shingle was 3 seconds with a weight loss of 7.5%. An untreated shingle, subjected to the same burning test, burned for 3 minutes and 25 seconds and was 100% consumed.

Example 2

187.5 g. of a 40% aqueous solution of the condensation product defined in Example 1 was mixed with 63.8 g. of a 39.2% solution of the polyethylenimine as defined in Example 1 and 100 g. of 37% aqueous $NH_4OH$. 648.7 g. of $H_2O$ was then added to make a 10% solute formulation. Cedar shingles were treated, dried at 90° C. for 15 minutes, subjected to the 30 shower-dry cycles and burned, all as described in Example 1. The solids pickup was 5.6%, burn time was 10 seconds, and the weight loss was 1.8%.

Example 3

138.3 g. of a 40% aqueous solution of the condensation product defined in Example 1 was mixed with 24.9 g. of the polyethylenimine as defined in Example 1 and 52 g. of 37% aqueous $NH_4OH$. 434 g. of $H_2O$ was then added to make a 10% solute formulation. Cedar shingles were treated, dried at 90° C. for 15 minutes, subjected to 30 shower-dry cycles and burned, all as described in Example 1. Instead of comparing the burn time and weight loss to untreated shingles, the comparison was made with cedar shingles which were treated with a 10% solids solution of the condensation product as described in Example 1. The condensation product-treated shingles were subjected to 30 shower-dry cycles and then burned as described in Example 1. They burned for 1 minute and 10 seconds with an 8% weight loss while the shingles treated with the polyethylenimine-$NH_4OH$-containing mixture A burned for 3 seconds with a 4% weight loss.

Example 4

1400 g. of a polyethylenimine-condensation product-$NH_4OH$-$H_2O$ solution (10% solids) was made using the same materials and ratios as described in Example 3. 700 g. of this 10% solids formulation was mixed with 400 g. of $H_2O$ and sprayed on a 4′ x 4′ simulated roof panel (made by nailing the cedar shingles as defined in Example 1 onto a 4′ x 4′ plywood panel so as to make a roof-like surface). This panel, hereinafter referred to as panel 1, was air dried in open sunlight and subjected to the usual 30 shower-dry cycles. The other 700 g. of the 10% solids formulation was brushed onto another 4′ x 4′ simulated roof panel, made as described above. This panel, hereinafter referred to as panel 2, was also air dried in open sunlight and subjected to the usual 30 shower-dry cycles. A control roof panel, made as described above and referred to as panel 3, was untreated. The flame source for this test was a class B brand as described in ASTME 108. Panel 3 burned for 75 minutes and was extinguished upon observation that total consumption was eminent, panel 2 burned very slowly for 30 minutes with about 10% of the panel area burned and panel 1 burned very slowly for 37 minutes with about 5% of the panel area burned.

I claim:

1. A composition comprising a complex of a polyalkylenepolyamine having an average molecular weight between 1,000 and 100,000 and a condensation product of phosphorus pentoxide and ammonia, wherein the weight ratio of condensation product to polyalkylenepolyamine is between 10 to 1 and 1 to 1.

2. A composition as described in claim 1 wherein the polyalkylenepolyamine is polyethylenimine.

3. A cellulosic substrate containing the composition as described in claim 1.

4. Wood containing the composition as described in claim 1.

5. A textile containing the composition as described in claim 1.

6. Paper containing the composition as described in claim 1.

7. The composition defined in claim 1 wherein said polyalkylenepolyamine has a molecular weight between 20,000 and 60,000.

References Cited

UNITED STATES PATENTS

| | | | |
|---|---|---|---|
| 1,975,072 | 10/1934 | Booth | 106—15X |
| 2,523,626 | 9/1950 | Jones et al. | 106—15X |
| 2,765,228 | 10/1956 | Jordan | 260—89.7UX |
| 2,870,042 | 1/1959 | Chance et al. | 117—136 |
| 3,029,283 | 4/1962 | Steinhauer | 117—136X |
| 3,102,821 | 9/1963 | Ellis | 106—15 |
| 3,115,482 | 12/1963 | Smith | 117—148X |
| 3,131,992 | 5/1964 | Jones | 252—8.1X |

WILLIAM D. MARTIN, Primary Examiner

H. J. GWINNELL, Assistant Examiner

U.S. Cl. X.R.

117—137, 143, 148, 155; 260—89.7, 875